US009639805B1

United States Patent
Feller et al.

(10) Patent No.: US 9,639,805 B1
(45) Date of Patent: May 2, 2017

(54) INFERRING TEMPORAL ATTRIBUTES OF A RECIPE

(71) Applicant: Yummly, Inc., Redwood City, CA (US)

(72) Inventors: David B. Feller, Mountain View, CA (US); Vadim Geshel, Redwood City, CA (US); Gregory Allen Druck, Jr., San Francisco, CA (US)

(73) Assignee: Yummly, Inc., Redwood City, CA (US)

( * ) Notice: Subject to any disclaimer, the term of this patent is extended or adjusted under 35 U.S.C. 154(b) by 439 days.

(21) Appl. No.: 14/479,053

(22) Filed: Sep. 5, 2014

Related U.S. Application Data

(60) Provisional application No. 61/943,238, filed on Feb. 21, 2014.

(51) Int. Cl.
  *G06N 5/04* (2006.01)
  *G06F 17/30* (2006.01)
  *G06N 99/00* (2010.01)

(52) U.S. Cl.
  CPC ....... *G06N 5/048* (2013.01); *G06F 17/30864* (2013.01); *G06N 99/005* (2013.01)

(58) Field of Classification Search
  None
  See application file for complete search history.

(56) References Cited

U.S. PATENT DOCUMENTS

| 6,975,910 | B1 | 12/2005 | Brown et al. |
| 2002/0107684 | A1 | 8/2002 | Gao |
| 2003/0045951 | A1 | 3/2003 | Luk |
| 2003/0046188 | A1 | 3/2003 | Orozco |
| 2004/0181427 | A1 | 9/2004 | Stobbs et al. |
| 2005/0114859 | A1 | 5/2005 | Srinivasa |
| 2007/0112554 | A1 | 5/2007 | Goradia |
| 2010/0179881 | A1 | 7/2010 | Wiederstein |
| 2011/0119130 | A1 | 5/2011 | Agan et al. |
| 2012/0150534 | A1 | 6/2012 | Sheehan et al. |
| 2013/0149675 | A1 | 6/2013 | Slone et al. |

(Continued)

OTHER PUBLICATIONS

West et al, From Cookies to Cooks: Insights on Dietary Patterns via Analysis of Web Usage Logs, 2013.*

(Continued)

*Primary Examiner* — Stanley K Hill
*Assistant Examiner* — Mikayla Chubb
(74) *Attorney, Agent, or Firm* — Fenwick & West LLP

(57) ABSTRACT

Embodiments infer a temporal attribute of a recipe. A recipe is obtained that includes recipe content such as preparation steps and ingredients. A recipe server identifies attribute features in the recipe content, where the attribute features are representative of portions of the recipe content that are correlated with temporal attributes. The recipe server determines whether the recipe is associated with a temporal attribute based on the attribute features and obtained attribute parameters corresponding to the attribute features. A temporal attribute determined to be associated with a recipe is transmitted to a client device in response to a request for the recipe. The estimated temporal attribute is used to filter recipes sent in response to a request for recipes, where the request specifies a criterion based on the temporal attribute. The estimated temporal attribute is used to select recipes for recommendation to a user based on a current time.

17 Claims, 7 Drawing Sheets

(56) References Cited

U.S. PATENT DOCUMENTS

| | | | | |
|---|---|---|---|---|
| 2013/0149679 A1* | 6/2013 | Tokuda | ............. | G09B 19/0092 434/127 |
| 2013/0282628 A1 | 10/2013 | Bengfort et al. | | |
| 2014/0081955 A1 | 3/2014 | Osaki | | |
| 2014/0280148 A1 | 9/2014 | Stankiewicz | | |

OTHER PUBLICATIONS

Andrew, G. et al., "Scalable Training of $L_1$-Regularized Log-Linear Models," Proceedings of the $24^{th}$ International Conference on Machine Learning, 2007, pp. 33-40.

Badra, F. et al., "TAAABLE: Text Mining, Ontology Engineering, and Hierarchical Classification for Textual Case-Based Cooking," In ECCBR Workshops, 2008, pp. 219-228.

Bridge, D. et al., "The Ghostwriter-2.0 Case-Based Reasoning System for Making Content Suggestions to the Authors of Product Reviews," Knowledge-Based Systems, May 2012, pp. 93-103, vol. 29.

Burges, C. et al., "Learning to Rank Using Gradient Descent," In Proceedings of the 22nd International Conference on Machine Learning, ICML '05, New York, NY, USA, ACM, 2005, pp. 89-96.

Druck, G. et al., "Spice It Up? Mining Refinements to Online Instructions from User Generated Content," In Proceedings of the 50th Annual Meeting of the Association for Computational Linguistics (ACL 2012), Jul. 8-14, 2012, pp. 545-553.

Forbes, P. et al., Content-Boosted Matrix Factorization for Recommender Systems: Experiments with Recipe Recommendation, in Proceedings of the Fifth ACM Conference on Recommender Systems, RecSys '11, New York, NY, USA, ACM, Oct. 23-27, 2011, pp. 261-264.

Freyne, J. et al., "Recipe Recommendation: Accuracy and Reasoning," in Proceedings of the 19th International Conference on User Modeling, Adaption, and Personalization, UMAP 11, LNCS 6787, 2011, pp. 99-110.

Herbrich, R. et al., "Large Margin Rank Boundaries for Ordinal Regression," Advances in Large Margin Classifiers, Eds. Smola, A.J. et al., MIT Press, Cambridge, MA, 2000, 20 pages.

Joachims, T., "Optimizing Search Engines Using Clickthrough Data," In KDD '02: Proceedings of the Eighth ACM SIGKDD International Conference on Knowledge Discovery and Data Mining, ACM, 2002, pp. 133-142.

Teng, C.Y. et al., "Recipe Recommendation Using Ingredient Networks," CoRR, abs/1111.3919, 2011, 10 pages.

Ueda, M. et al., "User's Food Preference Extraction for Cooking Recipe Recommendation," In SPJM, 2011, pp. 98-105.

Wang, L. et al., "Substructure Similarity Measurement in Chinese Recipes," In Proceedings of the 17th International Conference on World Wide Web, WWW '08, Beijing, China, Apr. 21-25, 2008, pp. 979-988.

Zhang, Q. et al., "Back to the Future: Knowledge Light Case Base Cookery," ECCBR Workshops, Proceedings of the Workshop on the Computer Cooking Contest, $9^{th}$ European Conference on Case-Based Reasoning, Schaaf, M. (Ed.), Jan. 1, 2008, pp. 239-248.0.

\* cited by examiner

100

600

Mr. Sam's Kitchen

Orange Tater Stew ← 612
Serves 6, 150 minutes ← 615

Ingredients: ← 620
1 gallon water
2 turnips and carrots
3 bay leaves
6 Russet potatoes
9 oz. pumpkin pulp
15 oz. rabbit
thyme and sage, to taste Directions:

Cut rabbit into cubes and cook to medium ← 630A
630B →     rare over open flame.
    → Wash and dice Russet potatoes, carrots,
      and turnips.
    Add bay leaves, thyme, and sage to water ← 630C
630D →     before boiling.
    → Stew rabbit, potatoes, carrots, and turnips
      for two hours.

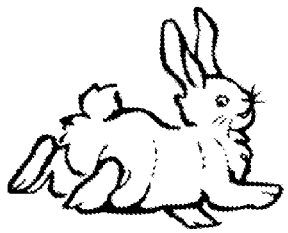

FIG. 6

INFERRING TEMPORAL ATTRIBUTES OF A RECIPE

CROSS-REFERENCE TO RELATED APPLICATION

This application claims the benefit of U.S. Provisional Application No. 61/943,238, filed Feb. 21, 2014, which is hereby incorporated by reference in its entirety.

BACKGROUND

Field of Disclosure

This disclosure relates generally to natural language processing and more particularly to inferring attributes of a recipe.

Description of the Related Art

Although recipes are available from many sources (e.g., the Internet), such recipes do not have a standard format and may omit various characteristics of a recipe such as seasons or holidays associated with a recipe. The holiday associated with a recipe is relevant for recipe users looking for recipes traditionally associated with the current season or an upcoming holiday. Other users may seek to avoid a temporally relevant recipe in favor of a recipe not associated with a particular holiday. For example, a user preparing a December dinner for a multi-religious group of friends looks for recipes without a connection to any religious December holidays.

Some recipes have associated metadata indicating recipe attributes. For example, a header of a HyperText Markup Language (HTML) page describing a recipe includes metadata tags categorizing a recipe. Unfortunately, such metadata tags are available only for a subset of recipes, and even those recipes with metadata tags typically do not include metadata tags that categorize a recipe by holiday or season.

Some recipes may include subjective descriptions by the author that indicate a recipe's holiday or seasonal associations. Accurately interpreting the text of a subjective description to determine seasonal associations of a recipe is a difficult natural language processing problem due to the numerous ways of expressing that a recipe is associated with a given season or holiday. Furthermore, such an approach does not provide temporal information indicating when a recipe is of interest to readers because the posting time of a recipe may lead or lag the time period during which a recipe is relevant.

SUMMARY

Embodiments infer seasonality or other temporal characteristics of a recipe. A recipe that includes ingredients and preparation steps is obtained. The preparation steps describe how to prepare the ingredients into a food item described by the recipe. Attribute features in the preparation steps are generated from the ingredients or the preparation steps. These attribute features are correlated to a temporal attribute of a recipe. Attribute parameters corresponding to generated attribute features in an attribute model are obtained. An obtained attribute parameter is specific to the temporal attribute. Whether the recipe is associated with the temporal attribute is determined by using the generated features as inputs to the attribute model modified by the obtained attribute parameters. The temporal attribute is stored in association with the recipe if the temporal attribute is determined to be associated with the recipe by the attribute model.

A temporal attribute associated with a recipe may be transmitted to a client device in response to a request for the recipe from the client device. In one embodiment, a request for recipes having a temporal attribute is received from a client device. The recipe is transmitted to the client device in response to determining that the recipe is associated with the temporal attribute. In one embodiment, it is determined whether multiple recipes are associated with the temporal attribute. A subset of these recipes is selected for recommendation to the user based on whether they are associated with the temporal attribute and a current time.

In one embodiment, the obtained attribute parameters associated with preparation steps are determined using an attribute model. Training attribute features are identified in training recipes having known training attribute indicators of particular temporal attributes, and the attribute model is trained to predict the presence of the particular temporal attributes from the identified training attribute features. In one embodiment, the attribute model is a logistic regression between the training attribute features and the known temporal attributes.

Embodiments include methods of inferring a temporal attribute of a recipe from content of that recipe. Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 6 illustrates an example recipe from a recipe source, in accordance with an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Recipe Extraction Environment

Figure 1:
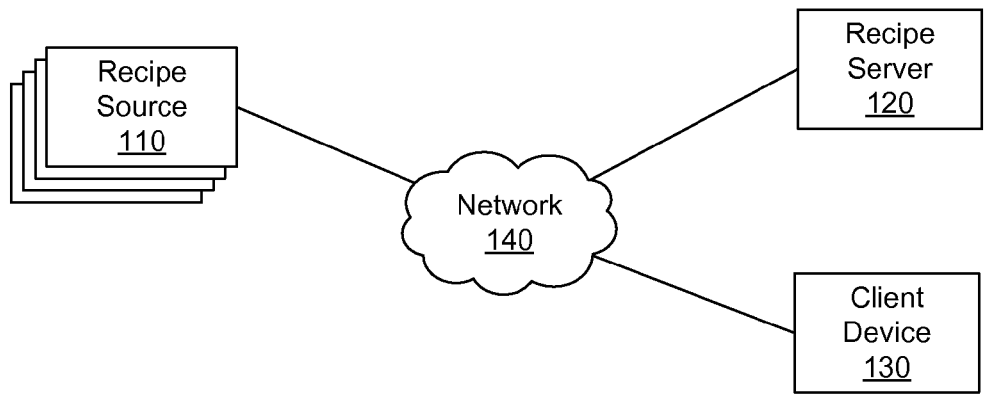
FIG. 1 is a high-level block diagram illustrating an environment for estimating temporal attributes of recipes, in accordance with an embodiment.

FIG. 1 is a high-level block diagram illustrating an environment 100 for inferring temporal attributes of recipes, in accordance with an embodiment. The environment 100 includes entities such as recipe sources 110, a recipe server 120, a client device 130, and a network 140. Although single instances of some of the entities are illustrated, multiple instances may be present. For example, multiple client devices 130 associated with multiple users may access recipes through the recipe server 120. The functionalities of the entities may be distributed among multiple instances. For example, a content distribution network (or a cloud-based network) of servers at geographically dispersed locations implements the recipe server 120 to increase server responsiveness.

A recipe source 110 is a repository of recipes accessible by the recipe server 120. Recipes are media describing preparation of a food item through text, images, video, animations, or other media. A food item is typically an edible substance consumed for nutrition or gustatory sensation and includes both solid and non-solid food items (e.g., beverages). In one embodiment, the recipe source 110 is a server hosting a webpage displaying recipes through a markup language (e.g., HTML) or another structured document format. A recipe source 110 may implement an application programming interface (API) functionality to provide recipe access to applications native to an operating system on a client device 130. The recipe source 110 may be implemented using a server, described further with respect to FIG. 8.

Alternatively or additionally, a recipe source 110 is a repository containing recipes in a structured document format. The repository may be a non-transitory computer-readable storage medium (e.g., a hard disk drive, an optical disc, a flash memory) accessible to the recipe server 120 through the network 140 or through a removable storage media interface. Non-transitory computer-readable storage media are further described with respect to FIG. 8.

The recipe server 120 hosts recipes for display to the user of a client device 130. In one embodiment, the recipe server 120 retrieves recipes from a recipe source 110 and analyzes the recipes to enable more uniform presentation through client devices 130 and to enable more efficient organization of recipes. The recipe server 120 may also infer properties of a recipe such as nutritional content, preparation time, expected number of servings, or attributes of a recipe such as seasonal associations of the recipe. Inferred properties of a recipe may be presented through a client device 130 along with the contents of a recipe. Attributes of a recipe are characteristics of the food item described by a recipe or of the preparation process described by the recipe. A temporal attribute describes a recurring period of time (e.g., time of day, one or more days of the week, one or more months of the year) associated with a recipe (e.g., a holiday, a user's birthday). One type of temporal attribute is a seasonal attribute, which is associated with an annually recurring event associated with a recipe (e.g., Christmas, Mardi Gras, Lent, summer, graduation). A seasonal attribute may also be associated with events occurring irregularly (e.g., religious observances recurring on non-Gregorian calendars). Other example attributes of a recipe include preparation difficulty, flavor, culinary groupings by tradition (e.g., cuisine), or by pairings with other food (e.g., typical course within a meal).

The recipe server 120 organizes recipes to present relevant or recommended recipes to a user of a client device 130. For example, the recipe server 120 organizes recipes to accurately interpret search queries better than a generic search algorithm. As another example, the recipe server 120 maintains a user profile to log a user's preferences, dietary restrictions, and culinary tastes. This user profile may be used to recommend items to the user and to increase relevance of search results to the user. The recipe server 120 is described further with respect to FIG. 2.

The client device 130 accesses recipes through the network 140 and presents the accessed recipes to the user. In one embodiment, the client device 130 is a computer, which is described further below with respect to FIG. 8. Example client devices 130 include a desktop, a laptop, a tablet, a mobile device, a smart television, and a wearable device. Using the client device 130, a user may access recipes on the recipe server 120. The user of a client device 130 may search through recipes on the recipe server 120 or request recipe recommendations from the recipe server 120. The client device 130 may contain software such as a web browser or another application for viewing recipes from the recipe server 120. The client device 130 may optionally access a recipe source 110 that displays recipes through a webpage or in another accessible form through the network 140.

The network 140 enables communications among the entities connected to it through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The network 140 may include multiple sub-networks linked to transfer data.

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Recipe Server

Figure 2:
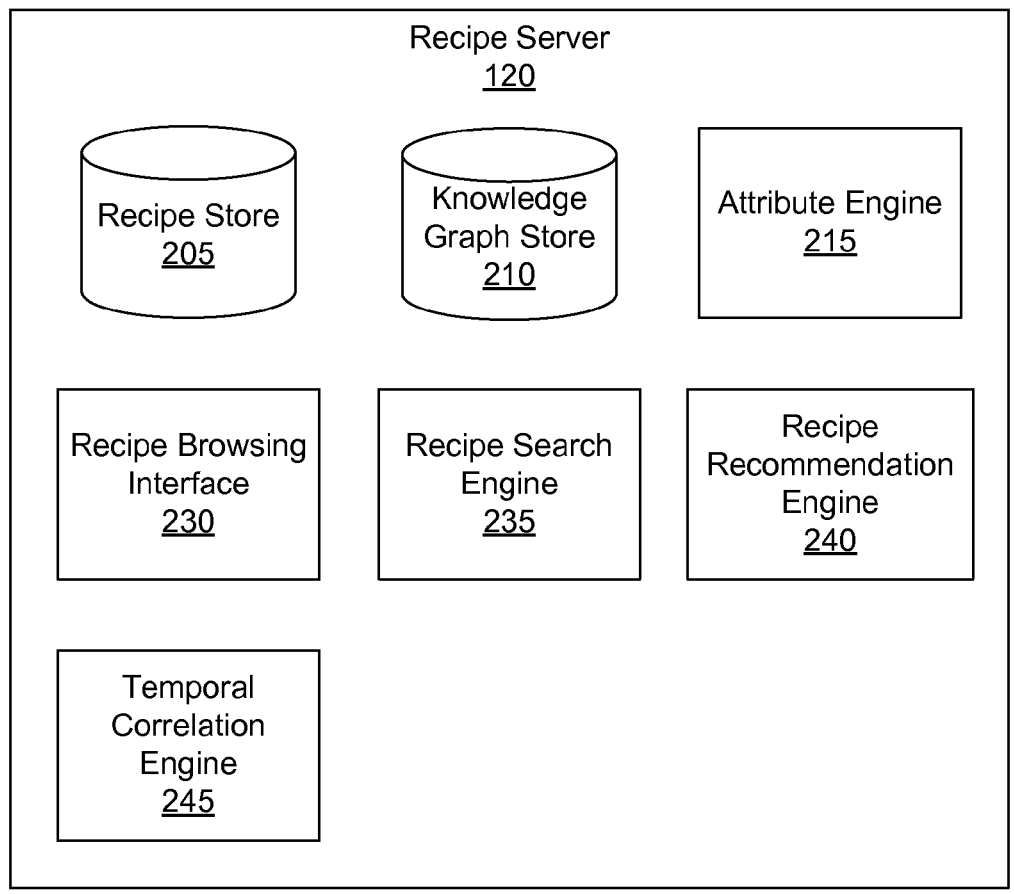
FIG. 2 is a block diagram illustrating a recipe server, in accordance with an embodiment.

FIG. 2 is a block diagram illustrating a recipe server 120, in accordance with an embodiment. The recipe server 120 includes a recipe store 205, a knowledge graph store 210, an attribute engine 215, a recipe browsing interface 230, a recipe search engine 235, and a recipe recommendation engine 240.

Recipe and Knowledge Graph Stores

The recipe store 205 contains labeled recipes. A labeled recipe includes source content of a recipe (or a pointer thereto) and classified recipe components. The source content of the recipe may be stored as a copy of the recipe from its original recipe source 110, or a pointer to the recipe on the recipe source 110. The source content of the recipe includes text of the recipe as well as accompanying images or other media (e.g., video, animations). Alternatively or additionally, the recipe store 205 contains recipes stored primarily in audio, video, or image form. A classified recipe component is content of a recipe that includes a type of information about a recipe such as its ingredients or its preparation steps. Other classified recipe components may include a number of servings, a serving size, an attribute, or a recipe title, for example.

The recipe server 120 obtains classifications of recipe components for storage in the recipe store 205. The recipe server 120 may obtain labels for recipe components from formatting metadata associated with the recipe and retrieved from the recipe source 110. Example recipe formatting metadata labels the recipe's title, ingredient block, and preparation steps. Alternatively or additionally, the recipe server 120 receives manual classifications of recipe components from a user through an interface to facilitate manual classification.

In one embodiment, the recipe server 120 separates the content of a recipe from the recipe source 110 into segments and classifies segments as different recipe components. For example, the recipe server 120 uses a machine learning algorithm (e.g., conditional inference on a random field, logistic regression) to infer recipe component classifications from features of the recipe including its structure and occurrences of known food-related terms (such as those in the knowledge graph 210). Various techniques for classifying recipe components are described in U.S. application Ser. No. 14/284,076, filed May 21, 2014, which is incorporated by reference in its entirety. Thus, the recipe store 205 contains labeled recipes with classified recipe components The knowledge graph store 210 contains a graph representing food knowledge. Example sections of the knowledge graph are provided in FIGS. 7A and 7B. The nodes of the graph represent food-related terms such as ingredients, cooking techniques, cooking equipment, and abstractions of food-related terms. Example nodes of the graph include "apple," "Gala apple," "fruit," "slicing," "peeling," "knife," and "peeler." Example nodes representing cooking techniques include "sautéing," "searing," and "sous vide." Example nodes representing cooking equipment include a "baking stone," a "mushroom brush," and "bamboo skewers."

Abstractions are broader categories of food-related terms, such as ingredients. For example, "steak" is an abstraction of "rib-eye steak." A node may be an abstraction with respect to another node and an ingredient with respect to another node. For example, "beef" is an abstraction of "Wagyu beef," and "meat" is a further abstraction of "beef." Similar to ingredients, a node representing a cooking technique or a piece of cooking equipment may be an abstraction of a cooking technique or a piece of cooking equipment. For example, nodes representing the cooking techniques "cutting" and "cooking" are abstractions of the cooking techniques "mincing" and "browning," respectively. As another example, a "baking container" is an abstraction of the cooking equipment "muffin pan" and "cookie sheet."

A node of the food knowledge graph may contain attributes of the food-related term that the node represents. For example, nodes representing ingredients contain nutritional density information and associated allergens and dietary restrictions. Nodes representing abstractions may similarly contain average nutritional density information as well as attributes (e.g., allergens such as gluten or nuts, dietary restrictions such as halal, vegan, or kosher) common to child ingredients of a parent abstraction. As another example, nodes representing cooking equipment indicate that the node is associated with a holiday.

The edges of the food knowledge graph may indicate relationships between nodes of the graph. The food knowledge graph has different types of edges representing different relationships, and two nodes may be connected by more than one edge. For example, one type of edge explicitly indicates the parent-child relationship between an ingredient and an abstraction (e.g., "black beans are a kind of beans"). Another type of edge between two nodes representing two ingredients indicates that the ingredients have equivalent nutritional content (e.g., "a Fuji apple is the nutritional equivalent of a Gala apple"). Edges may connect similar nodes, such as an edge representing substitutability between ingredients represented by two nodes. An edge between a node representing an ingredient and a node representing cooking equipment or a cooking technique indicates that the ingredient is commonly used with the cooking equipment or technique (e.g., "potatoes are often used with ovens," "potatoes are often baked"). Similarly, an edge between a node representing a cooking technique and a node representing cooking equipment indicates that the cooking equipment may be used in a cooking technique (e.g., "an oven is used for baking").

In addition to ingredients, abstractions of ingredients, cooking techniques, and cooking equipment, the knowledge graph may contain nodes representing units of measure (e.g., cup, ounce, cubic centimeter, pinch). These nodes may have attributes indicating common abbreviations of the unit of measure, and edges between these nodes may represent unit conversions between dimensionally consistent units of measure. Hence, the nodes, attributes of nodes, and edges between nodes serve to organize food knowledge in the knowledge graph store 210.

Inferring and Applying Recipe Attributes

The attribute engine 215 identifies properties of recipes from the recipe store 205. More specifically, the attribute engine 215 determines whether a recipe is associated with a temporal attribute. A temporal attribute indicates a recurring period of time or recurring event associated with a recipe. In one embodiment, a temporal attribute includes a temporal range and a label. The temporal range indicates a start time and an end time between which the temporal attribute is relevant (e.g., time of day, one or more days of the week, a range of dates). The label identifies the time range of the temporal attribute (e.g., "lunch," "midnight snack," "Sunday brunch," "St. Patrick's Day," "summer").

In one embodiment, the temporal attribute includes a relevance function indicating the relevance of the temporal attribute as a function of time. The attribute engine 215 determines the relevance function for a temporal attribute. For example, the temporal attribute with the label "Christmas," (which is also a seasonal attribute) has a start time on Black Friday and an end time on Boxing Day. The relevance function of Christmas increases steadily from Black Friday to Christmas Day and then rapidly decreases from Christmas Day to Boxing Day.

In one embodiment, a temporal attribute is associated with one or more geographic locations (e.g., cities, states, regions, countries). Hence, different temporal attributes may apply to different geographical regions. The attribute engine 215 determines temporal attributes applicable to different geographic locations. For example, a temporal attribute with a "winter" label for Vermont has a start time of early November and an end time of mid-May; in contrast, a temporal attribute with a "winter" label for Los Angeles has a start time of December and an end time of February.

In one embodiment, the attribute engine 215 infers an association between a temporal attribute and a recipe using attribute features of the recipe. The attribute engine 215 generates attribute features from data in the knowledge graph store 210, data derived from natural language processing, or temporal engagement data. Temporal engagement data refers to time-stamped engagements with a recipe. The attribute engine 215 determines whether a recipe is associated with a temporal attribute by using the attribute features as an input to an attribute model. The attribute model produces an output that reflects whether a recipe is associated with a given temporal attribute. The recipe server 120 uses temporal attributes of a recipe as an input to the recipe browsing interface 230, the recipe search engine 235, or the recipe recommendation engine 240.

The recipe browsing interface 230 presents an inferred temporal attribute in an interface for browsing and searching for recipes. For example, the browsing interface 230 displays the temporal attribute in a summary of a recipe that also includes the recipe's title and a representative image of the recipe. As another example, the browsing interface 230 presents a collection of recipes having a particular temporal attribute (or a combination of temporal attributes). For example, the interface 230 presents recipes having a "Thanksgiving" seasonal attribute or recipes having a "tea time" temporal attribute. The recipe browsing interface 230 may also display the recipe attribute in a detailed view of the recipe displaying its ingredients, preparation steps, and other inferred attributes. If a client device 130 requests a recipe, then the recipe server 120 transmits the recipe to the client device 130 in response, optionally including the recipe's associated temporal attributes.

The recipe search engine 235 may use an inferred temporal attribute to filter recipes in response to a request for recipes. In one embodiment, the recipe search engine 235 receives a request for recipes (such as a search query) from a client device 130. The request for recipes (or search query) specifies one or more criteria containing a temporal attribute. For example, the request specifies recipes having a particular temporal attribute (e.g., "St. Patrick's day lunch") or not having a particular temporal attribute (e.g., "dessert not Valentine's Day"). The recipe search engine 235 identifies recipes from the recipe store 205 that have a specified temporal attribute or that otherwise meet the specified criteria. The identified recipes are transmitted to the client device 130. For example, recipes meeting the criteria are displayed in the recipe browsing interface 230. Other example criteria in the request for recipes could include ingredients in a recipe, dietary restrictions a recipe complies with, meals, cuisines, occasions, or recipe titles. The recipe search engine 235 may rank recipes meeting the criteria of the request for recipes using the output of the recommendation engine 240.

The recipe search engine 235 may determine a ranking of recipes according to relevance to the request for recipes, quality of a recipe, the current time, a temporal attribute of a recipe, or another attribute of a recipe. The recipe search engine 235 determines relevance of a recipe to the request based on number of instances of a search term in a recipe, for example. The quality of a recipe may refer to a rating of a recipe determined from users of the recipe server 120 or a number of views on the recipe server 120 (or at the recipe source 110). The recipe search engine 235 may modify the ranking of a recipe based on whether the time of the request is within a time range of a temporal attribute associated with the recipe. For example, the recipe search engine 235 increases the search ranking of gingerbread cookie recipes among other cookie recipes between December $1^{st}$ and December $25^{th}$. The recipe search engine 235 may rank a recipe based on a relevance function of a temporal attribute associated with a recipe and the current time. For example, the recipe search engine 235 computes scores for recipes and ranks the recipes by the scores. The recipe search engine 235 determines the relevance of a temporal attribute to the current time by using the current time as an input to the temporal attribute's relevance function. The recipe search engine 235 modifies the score of the recipe in proportion to the output of the relevance function.

Alternatively or additionally, the recipe search engine 235 filters a recipe sent in response to a request for recipes based on a temporal range of a temporal attribute associated with the recipe and a current time. For example, recipes associated with an "Oktoberfest" seasonal attribute are filtered from a response to a request when the current time is outside of the temporal range of the "Oktoberfest" temporal attribute. Hence, the recipe search engine 235 provides temporally relevant responses to user requests for recipes.

The recipe recommendation engine 240 may use the estimated temporal attribute to select recipes that are more relevant to a user. In one embodiment, the recipe server 120 stores user preferences including preferences for temporal attributes of recipes. The user preferences may include deterministic rules used to filter recipes, including filters based on temporal attributes (e.g., no Christmas recipes, no Valentine's Day recipes). The user preferences may also include features representing tendencies of a user, which may be used to calculate a recommendation score representing a recipe's appeal to a user. For example, the user preferences of a user specify enthusiasm for spicy foods and disinclination towards creamy foods, so the recipe recommendation engine 240 calculates high recommendation scores between the user and recipes with plenty of capsaicin but with low concentrations of triglycerides. The recipe recommendation engine 240 selects a subset of recipes to recommend to the user based on a current time, attributes of those recipes, and user preferences of the user.

In one embodiment, the recipe recommendation engine 240 increases recommendation scores of recipes having a temporal attribute with a time range encompassing the current time. The recipe recommendation engine 240 may use recommendation scores to select the recipes (e.g., by comparing selected recipes to a threshold, by ranking the recipes according to their recommendation). For example, a user's preferences indicate that the user is partial towards Halloween recipes. In this example, the recipe recommendation engine 240 determines higher recommendation scores for recipes that have a Halloween seasonal attribute if the current time is October.

The recipe recommendation engine 240 may solicit user preferences (e.g. through the recipe browsing interface 230) or may infer user preferences. For example, the recipe browsing interface 230 includes feedback mechanisms (e.g., ratings) for a user to express an opinion towards a recipe. In this example, the recipe recommendation engine 240 modifies a user's inferred preferences in concordance with ratings of recipes and temporal attributes for rated recipes. Hence, the recipe recommendation engine 240 selects recipes for presentation to a user based in part on temporal attributes of selected recipes and user preferences about temporal attributes.

Temporal Correlation

The temporal correlation engine 245 receives time-stamped engagements between users and recipes, determines temporal correlations of the recipes based on the time-stamped engagements, and outputs temporal correlations for use by the attribute engine 215. A temporal correlation of a recipe is an association between a recipe and a time period. In one embodiment, the recipe server 120 receives an engagement through the recipe browsing interface 230 and records a time of the engagement to generate a time-stamped engagement. The temporal correlation engine 245 associates the time-stamped engagement with one or more recipes. An engagement may include a feedback interaction between a user and a recipe (e.g., a rating, an indication of approval or disapproval), an impression of a recipe to a user (e.g., a page view), or a search query. The temporal correlation engine 245 associates a recipe with a search query if the recipe appears in search results generated for that search query by the recipe search engine 235. Hence, the recipes appearing in the search results are associated with the time of the search query even if the search query is not directed explicitly at any of the recipes.

Using the time-stamped engagements associated with a recipe, the temporal correlation engine 245 determines whether a recipe is associated with one or more time periods. In one embodiment, the temporal correlation engine 245 groups time-stamped engagements with a recipe by discrete periods of time. For example, to determine a temporal correlation for time of the day, the temporal correlation engine 245 groups engagements occurring within each hour of a day (regardless of date). As another example, the temporal correlation engine 245 groups engagements occurring on the same day regardless of time to identify seasonal correlations. The temporal correlation engine 245 then determines a measure of correlation between the recipe and a given time period using frequency of the grouped engagements in the given time period relative to the total number of engagements with the recipe and relative to the total number of engagements with all recipes during the given time period. For example, the temporal correlation engine 245 calculates the measure of correlation from the pointwise mutual information (PMI) between a recipe and a given time period using the engagements in that time period. Alternatively or additionally to using PMI, the temporal correlation engine 245 calculates the measure of correlation from a G-test (e.g., likelihood ratio) or any other measure of dependence between two random variables from a contingency table. In one embodiment, the temporal correlation engine 245 associates a recipe with a time period by comparing the measure of correlation between the recipe and the time period to a correlation threshold.

In one embodiment, the temporal correlation engine 245 identifies temporal correlations between two different sets of time-stamped engagements. The first set of engagements includes engagements having a semantic component corresponding to a temporal attribute (e.g., "summer," "Halloween"). The second set of engagements includes engagements with a particular recipe (e.g., page views on the recipe). The temporal correlation engine 245 identifies the temporal attribute from the first set of engagements and the recipe from the second set of engagements. The temporal correlation engine 245 determines the strength of the correlation by comparing timestamps of the first and second sets of engagements. For example, the temporal correlation engine 245 determines temporal correlations between a recipe and a Halloween temporal attribute using the times the recipe was viewed and the times that users searched for "Halloween." In some embodiments, the temporal correlation 245 may determine temporal correlations without sorting time-stamped engagements into discrete time periods.

In one embodiment, the temporal correlation engine 245 may further differentiate temporal correlations based on characteristics of users interacting with a recipe. Hence, a recipe may be associated with a time period for users having a set of user characteristics but not for other users not having the set of user characteristics. User characteristics may be provided by the user as part of a user profile or inferred by the recipe server 120. Example user characteristics include geographic location, gender, or other demographic characteristics of users. In one embodiment, the temporal correlation engine 245 filters time-stamped engagements with a recipe by one or more user characteristics of the engaging users and then determines the time periods with which the recipe is associated from the filtered time-stamped engagements. The attribute engine 215 may use temporal correlations associated with user characteristics to associate a recipe with a temporal attribute for users having the user characteristics. The recipe browsing interface 230, the recipe search engine 235, and the recipe recommendation engine 240 may then be personalized for a user based on a user's characteristics.

Attribute Engine

Figure 3:
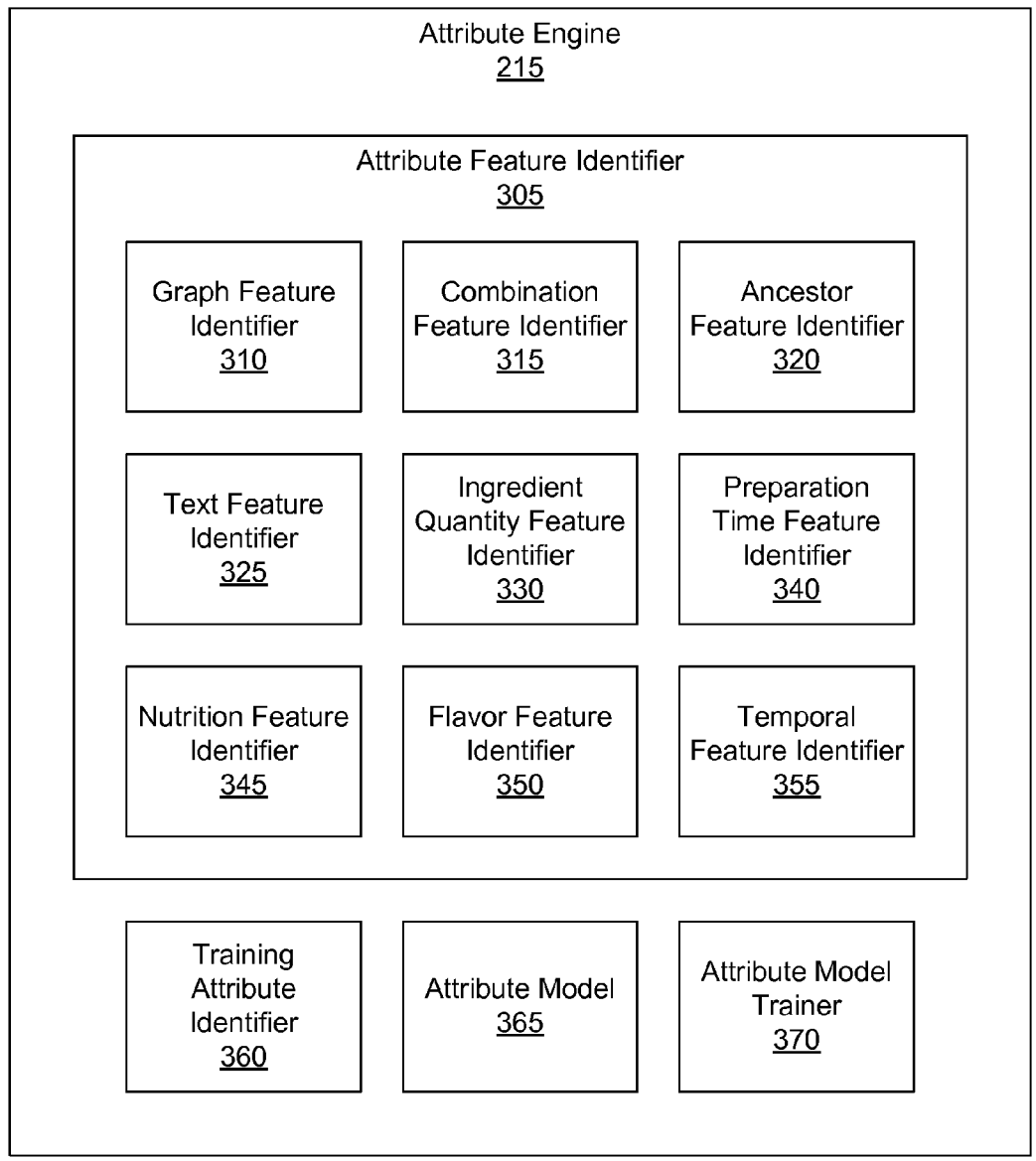
FIG. 3 is a block diagram illustrating an attribute engine, in accordance with an embodiment.

FIG. 3 is a block diagram illustrating an attribute engine 215, in accordance with an embodiment. The attribute engine 215 includes an attribute feature identifier 305, a training attribute identifier 360, an attribute model 365, and an attribute model trainer 370.

Attribute Features

The attribute feature identifier 305 generates attribute features from the content of a recipe. The attribute feature identifier 305 generates attribute features from the preparation steps, ingredients, and/or the title of a recipe as well as subjective commentary or description of a recipe. The generated attribute features are correlated with one or more temporal attributes and are used as inputs to the attribute model 365. The attribute feature identifier 305 includes a graph feature identifier 310, a combination feature identifier 315, an ancestor feature identifier 320, a text feature identifier 325, an ingredient quantity feature identifier 330, a preparation time feature identifier 340, a nutrition feature identifier 345, a flavor feature identifier 350, and a temporal feature identifier 355.

The graph feature identifier 310 generates attribute features from text corresponding to ingredients, preparation equipment, cooking techniques, or other nodes in the knowledge graph store 210. For the example recipe preparation step "mash the potatoes with a potato ricer," the graph feature identifier 310 creates attribute features corresponding to the cooking technique "mashing" and to the cooking equipment "potato ricer." Some food-related terms may have alternative names or commercial names, but the nodes of the food knowledge graph representing the food-related terms may include these alternative or commercial names. For example, the graph feature identifier 310 recognizes "Ben & Jerry's Yes Pecan! ice cream" as a pecan ice cream based on a listing of known commercial names of pecan ice cream. For example, an example attribute feature representing pecan ice cream may be associated with a "summertime" seasonal attribute.

The graph feature identifier 310 may include additional algorithms to identify cooking techniques. Because cooking techniques are typically described using verbs, they may have different forms (e.g., "baking," "bake," "bakes," "baked"). Furthermore, words that normally describe cooking techniques may be used to describe ingredients (e.g., a "baked potato"). To assist in identifying cooking techniques, the graph feature identifier 310 uses a part-of-speech classifier (e.g., the Stanford parser), the food knowledge graph, or an external dictionary.

The combination feature identifier 315 generates attribute features representing combinations of food-related terms in the food knowledge graph. Although the combination feature identifier 315 typically generates attribute features corresponding to pairs or triplets of nodes, the combination feature identifier 315 may generate attribute features corresponding to any number of nodes. Similar to the graph feature identifier 310, the combination feature identifier 315 matches the content of a recipe to nodes of the food knowledge graph. An example attribute feature corresponding to the pairing of the ingredient "pumpkin" and the cooking technique "baking" may be associated with a "Halloween" temporal attribute.

The ancestor feature identifier 320 generates attribute features corresponding to abstractions in the food knowledge graph. Similar to the graph feature identifier 310, the ancestor feature identifier 320 recognizes food-related terms in the content of a recipe that match nodes in the food knowledge graph. The ancestor feature identifier 320 then generates a feature corresponding to an abstraction of the node matching the content of the recipe. For example, the ancestor feature identifier 320 recognizes the text "weisswurst" in a recipe and generates an attribute feature corresponding to the abstraction "sausage." Attribute features corresponding to abstractions improve results for recipes having uncommon ingredients, cooking equipment, or other food-related terms.

The text feature identifier 325 generates attribute features corresponding to text in a recipe that is not represented in the food knowledge graph. The text feature identifier 325 identifies strings of text matching strings that correspond to an attribute feature. For example, an attribute feature corresponding to the text "spooky" indicates that a recipe is more likely to be associated with a "Halloween" seasonal attribute. Multiple strings may map to the same attribute feature to account for variations in a term.

The ingredient quantity feature identifier 330 generates attribute features corresponding to the number or quantity of ingredients in a recipe. The quantity feature identifier 330 generates attribute features indicating deviation from normal quantities of an ingredient. For example, a recipe calling for significant amounts of orange food coloring should be associated with a "Halloween" seasonal attribute. The ingredient quantity feature identifier 330 may also generate features from a number of servings indicated by a recipe. An example attribute feature corresponding to a recipe making more than a dozen servings is more likely to be associated with a "Thanksgiving" seasonal attribute than a recipe making four servings. The ingredient quantity feature identifier 330 may generate features corresponding to the number of ingredients in a recipe. For example, a recipe having fewer ingredients (e.g., a grilled cheese sandwich) is likely to be associated with a "midday" temporal attribute, and a recipe having many ingredients (e.g., a turducken) is likely to be associated with an "evening" temporal attribute.

The ingredient quantity feature identifier 330 may generate an attribute feature that reflects the quantity of an ingredient in a recipe relative to other recipe's quantities of that ingredient. In one embodiment, the ingredient quantity feature identifier 330 determines a standardized quantity q by converting a quantity of an ingredient in a particular unit of measure to a standard unit of measure for comparison. For example, the standardized quantity q is an ingredient's mass fraction (i.e., the ingredient's mass normalized by the total mass of ingredients in the recipe). The standardized quantity q is then compared against standardized quantities of the ingredient found in other recipes. For example, the ingredient quantity feature identifier 330 obtains the mean $\mu$ and standard deviation $\sigma$ among standardized quantities of an ingredient across recipes in the recipe store 205. The ingredient quantity feature identifier 330 then computes a normalized ingredient quantity $$z = \frac{q-\mu}{\sigma}.$$

Hence, the normalized ingredient quantity indicates whether a recipe has a higher than normal or a lower than normal quantity of an ingredient in terms of a number of standard deviations from the mean standardized quantity of that ingredient.

The preparation time feature identifier 340 generates attribute features corresponding to preparation time of a recipe. The preparation time feature identifier 340 may obtain a total preparation time from an explicit total time contained in the content of a recipe. Alternatively or additionally, the preparation time feature identifier 340 infers total preparation time of a recipe from the content of the recipe, as described further in U.S. application Ser. No. 14/316,060, filed Jun. 26, 2014, which is hereby incorporated by reference in its entirety. An attribute feature corresponding to a longer total preparation time may be more likely to be associated with an "evening" temporal attribute than a "morning" temporal attribute.

The nutrition feature identifier 345 generates attribute features corresponding to nutritional content of a recipe. Nutritional content are values indicating macronutrients (e.g., fats, carbohydrates, proteins, sugars, water, vitamins, minerals) or calories in food. Nutritional values may be expressed in terms of total values per serving, density values normalized by estimated serving weight, or percentage daily values normalized by recommended total daily intake. The recipe server 120 determines nutritional values for a recipe from quantities of ingredients in the recipe. In one embodiment, the recipe server 120 uses nutritional information in nodes of the food knowledge graph corresponding to the ingredients of a recipe. The nutrition feature identifier 345 generates nutritional features corresponding to nutritional values or corresponding to nutritional values normalized relative to nutritional values of other recipes in the recipe store 205. For example, an attribute feature indicating high sugar content is indicative that a recipe is associated with a "winter" temporal attribute.

The flavor feature identifier 350 generates attribute features corresponding to expected flavor of a recipe. A flavor feature estimates the gustatory sensation from consuming a food item described by a recipe. Example flavor features represent sweetness, sourness, saltiness, bitterness, meatiness, spiciness, and coolness. In one embodiment, the flavor feature identifier 350 estimates a flavor feature of a recipe by identifying the quantity of one or more compounds associated with the feature in ingredients of the recipe. For example, the recipe server 120 identifies the amount of capsaicin in a recipe's ingredients to estimate spiciness. If more than one compound contributes to a flavor attribute feature, the flavor feature identifier 350 may determine a linear combination of the quantities of the compounds contributing to the flavor attribute feature. The identified quantity of the one or more compounds is normalized to a density by the total weight of ingredients, and then compared against spiciness of other recipes in the recipe store 205. For example, a spiciness feature indicates a recipe's percentile of spiciness relative to other recipes. An example recipe having an attribute feature indicating spiciness is more likely to be associated with a "Cinco de Mayo" seasonal attribute than a "Christmas" seasonal attribute.

The temporal feature identifier 355 generates temporal features corresponding to temporal correlations of a recipe. In one embodiment, the temporal feature identifier 355 uses temporal correlations determined by the temporal correlation engine 245. A temporal feature corresponds to a recurring time or time period (e.g., 5-6 pm on a weekend, Mondays, December). In one embodiment, the temporal feature identifier 355 determines whether a temporal feature is associated with a recipe according to whether the recurring time of the temporal feature corresponds to a time period of a temporal correlation. For example, if the temporal correlation engine 245 identifies a temporal correlation between a recipe and the time range March to September, then the temporal feature identifier 355 associates the recipe with temporal features representing March, April, May, June, July, August, and September. Such an example recipe is more likely to be associated with a "spring" or "summer" temporal attribute than a "fall" or "winter" temporal attribute.

Although the attribute feature identifier 305 is described as generating attribute features from text of the recipe, the attribute feature identifier 305 may alternatively or additionally generate attribute features from images, videos, audio, animations, or other content in a recipe. For example, the recipe server 120 applies optical character recognition to recognize text in images, videos, or animations to produce text analyzable by the attribute feature identifier 305. As another example, the recipe server 120 uses speech-to-text transcription to recognize spoken text in videos or audio.

Temporal Attributes

The training attribute identifier 360 determines training attribute indicators of training recipes, which the attribute model trainer 370 uses to determine attribute parameters of the attribute model 365. A training attribute indicator may be binary or may have a continuous value (e.g., a probabilistic assessment of whether the recipe is associated with the temporal attribute). The training attribute identifier 360 may obtain training attribute indicators from recipes labeled with temporal attributes. For example, an administrator of the recipe server 120 labels the recipes with a temporal attribute, or the recipe server 120 retrieves metadata tags indicating temporal attributes from the recipe source 110.

In one embodiment, the training attribute identifier 360 uses reviews (or other non-author comments on a recipe) to determine training attribute indicators for recipes. The recipe server 120 may obtain recipe reviews from the recipe source 110 or from recipes submitted to the recipe server 120 through the recipe browsing interface 230. The training attribute identifier 360 matches text present in reviews to particular temporal attributes using regular expressions. For example, the training attribute identifier 360 determines that a recipe is associated with a "winter" temporal attribute if the text "cold night," "bundled up," or "by the fireplace" is present in a review of a recipe. The training attribute identifier 360 may employ exclusion regular expressions that prevent a negated instance of a word from incorrectly associating a recipe with a temporal attribute. For example, the exclusion regular expression "not . . . " excludes subsequent words from influencing temporal attributes of a recipe.

Alternatively or additionally to using regular expressions, the training attribute identifier 360 uses a machine learning classifier to determine whether a review is indicative of a temporal attribute. The features of the machine learning classifier include different words of text or regular expressions in reviews. The machine learning classifier is trained using reviews determined to be associated with various temporal attributes by manual classification or regular expressions. For example, the machine learning classifier is implemented using a logistic regression model or other statistical classifier.

In one embodiment, the training attribute identifier 360 imposes a threshold number or proportion of recipe reviews associated with a temporal attribute. The training attribute identifier 360 associates the recipe with the temporal attribute if the number or proportion of recipe reviews with qualifying text equals or exceeds the threshold. Alternatively or additionally, the training attribute identifier 360 determines the training attribute indicator as a numerical value from the proportion of reviews of a recipe having text corresponding to the temporal attribute.

Alternatively or additionally to using reviews, the training attribute identifier 360 uses temporal correlations with time-stamped engagements, as determined by the temporal correlation engine 245, to determine training attribute indicators for a training recipe. In one embodiment, the training attribute identifier 360 compares the time range of a temporal attribute with the time period associated with a training recipe, as indicated by a temporal correlation. If the time range of the temporal attribute matches the time period of the temporal correlation, then the training attribute identifier 360 determines that the training recipe is associated with the temporal attribute and outputs a corresponding training attribute indicator.

In one embodiment, the training attribute identifier 360 determines numerical values for a training attribute indicator. The training attribute identifier 360 may determine a numerical value from the proportion of overlap between a time range of a temporal attribute and the time period of a temporal correlation. For example, if a training recipe has a temporal correlation from the time period Monday to Thursday, and a "weekday" temporal attribute has a time range from Monday to Friday, then the training attribute indicator of the recipe is 0.8. Alternatively or additionally, the training attribute identifier 360 determines numerical values for a training attribute indicator from a proportion of time-stamped engagements with a recipe that occur within the time range associated with the temporal attribute.

The attribute model 365 determines whether a recipe is associated with a temporal attribute by using as inputs the attribute features generated from the content of the recipe. The output of the attribute model 365 indicates whether the recipe is associated with the temporal attribute. For example, if the output of the attribute model 365 equals or exceeds a threshold, then the recipe is associated with the temporal attribute. The attribute model 365 is modified by different sets of attribute parameters corresponding to different temporal attributes. The attribute model trainer 370 determines the set of attribute parameters corresponding to a particular temporal attribute by training the recipe model with training recipes known to be associated or not associated with the particular temporal attribute.

To determine the attribute parameters corresponding to a temporal attribute, the attribute model trainer 370 obtains training recipes. Training recipes include recipe content and have an associated training attribute indicator of a particular temporal attribute, as determined by the training attribute identifier 360. The attribute model trainer 370 uses attribute features that the attribute feature identifier 305 generates for the training recipes. The attribute model trainer 370 then determines attribute parameters so that the attribute model 365 predicts whether a recipe is associated with the temporal attribute given the attribute features of the training recipes. In one embodiment, the attribute model trainer 370 iteratively modifies the attribute parameters to decrease discrepancy between predictions of the attribute model 365 and the training attribute indicators.

When the training attribute identifier 360 determines training attribute indicators based on temporal correlations, the attribute model trainer 370 may over-fit attribute features to attribute features derived from temporal correlations. In this case, over-fitting of attribute features means that attribute features not derived from temporal correlations become negligible in the output of the attribute model 365. Accordingly, the attribute model trainer 370 excludes attributes features derived from temporal correlations as inputs to the attribute model 365 when the attribute model identifier 360 derives training attribute indicators from temporal correlations.

In one embodiment, the attribute model 365 is a logistic regression model. In the logistic regression model, a given attribute feature has a corresponding attribute parameter (e.g., a weight). The products of attribute features and their corresponding attribute parameters are summed, and a sigmoidal function is applied to the sum. In other words, the logistic regression model applies a sigmoidal function to an inner product between a vector representation of attribute features and a vector representation of corresponding attribute parameters. The resulting output is between zero and one (or in another range depending on the sigmoidal function). Hence, the output of the logistic regression model is the probability that a recipe is associated with the attribute feature. If the attribute model 365 is a logistic regression model, then the attribute model trainer 370 trains the attribute model 365 using logistic regression between the attribute features of the training recipes and the obtained training attribute indicators. The determined coefficients from the logistic regression are the attribute parameters corresponding to the temporal attribute.

In one embodiment, the attribute model 365 implements a learning to rank machine learning algorithm. For example, the attribute model 365 determines a difference vector between vectors representing attribute features of two different recipes. The inner product between the difference vector and a vector representing corresponding attribute parameters corresponds to the relative ranking between the two different recipes. To train the learning to rank algorithm, the attribute model trainer 370 ranks the training recipes by the training attribute indicator (e.g., proportion of reviews for a recipe indicating that the recipe is associated with the temporal attribute, proportion of engagements for a recipe within a time range of the temporal attribute). The attribute model trainer 370 determines attribute parameters so that a ranking of the training recipes by the output of the attribute model 365 corresponds to the ranking of the training recipes by their training attribute indicators. If the attribute model 365 implements learning to rank using a logistic regression model, then the attribute model trainer 370 may efficiently determine the attribute parameters using logistic regression.

The attribute model trainer 370 may incorporate an objective function to determine "optimal" attribute parameters. For example, the objective function indicates discrepancy between output of the attribute model 365 and the training attribute indicators of the training recipes (e.g., sum-squared error). Alternatively, the objective function is a likelihood function (or a log-likelihood function) indicating a probability that the attribute parameters predict the attribute indicators for the input attribute features. The attribute model trainer 370 may determine attribute parameters by optimizing the objective function. Optimizing the objective function includes minimizing the objective function (for a measure of discrepancy) or maximizing the objective function (for a likelihood function).

Optionally, the attribute model trainer 370 may implement a regularizer term in its objective function (e.g., an addition to an error term, a subtraction from a likelihood function) to avoid over-fitting of data. For example, a L1 regularizer subtracts the sum of the attribute parameters' magnitudes (i.e., the L1 norm, the "taxicab" distance of a vector of the attribute parameters from the origin) from a likelihood-based objective function. Performing L1 regularization (or some other regularization) may result in some attribute parameters having a value of zero (or a substantially negligible value). Attribute features associated with these attribute parameters having a value of zero (or a value with a magnitude below a threshold) may be omitted from the attribute model 365, which beneficially reduces computational time to subsequently determine whether a recipe is associated with a temporal attribute.

It should be noted that an attribute parameter (e.g., a weight) is associated with a particular temporal attribute (e.g., Christmas) and does not vary with respect to which recipe is input to the attribute model 365. In contrast to attribute parameters, attribute features (e.g., whether a recipe includes a candy cane, whether a recipe contains the word "green") are associated with a particular recipe and do not vary with respect to the various temporal attributes (e.g., whether the recipe is associated with Christmas), which are determined based on the output of the attribute model 365.

In sum, the attribute engine 215 determines whether a recipe is associated with a temporal attribute by generating attribute features for a recipe (by the attribute feature identifier 305), obtaining attribute parameters (as determined by the attribute model trainer 370), and then determining the output of the attribute model 365 for the attribute features and attribute parameters. This output of the attribute model 365 indicates whether the recipe is associated with the temporal attribute. In one embodiment, the attribute engine 215 determines that a recipe is associated with a temporal attribute if the output of the attribute model 365 equals or exceeds a threshold output. The threshold output may be determined based on a ranking of recipes by output from the attribute model. For example, the threshold output is set such that a recipe is associated with a temporal attribute if the output of the temporal model 365 for that recipe is among the top-ten percent of recipes as ranked by the output of the attribute model 365 with respect to that temporal attribute.

Although the training attribute identifier 360 may infer temporal attributes of a recipe from its reviews, not all recipes have corresponding reviews (or sufficient reviews for accurate inference of temporal attributes). Similarly, some recipes may not have sufficient time-stamped engagements to infer a temporal attribute. A temporal attribute may be associated with an event (e.g., a holiday, an occasion) having foods with common characteristics more specific than a correlation with a time period. For example, temporal attributes corresponding to Halloween and Dia de los Muertos have similar time ranges, but recipes having these different temporal attributes are distinct. The attribute model trainer 370 determines attribute parameters so that that the attribute model 365 can infer temporal attributes of a recipe from the content of the recipe. Hence, the attribute model 365 provides more reliable and nuanced association between a recipe and temporal attribute than recipes or temporal correlations alone.

Recipe Attribute Inference

Figure 4:
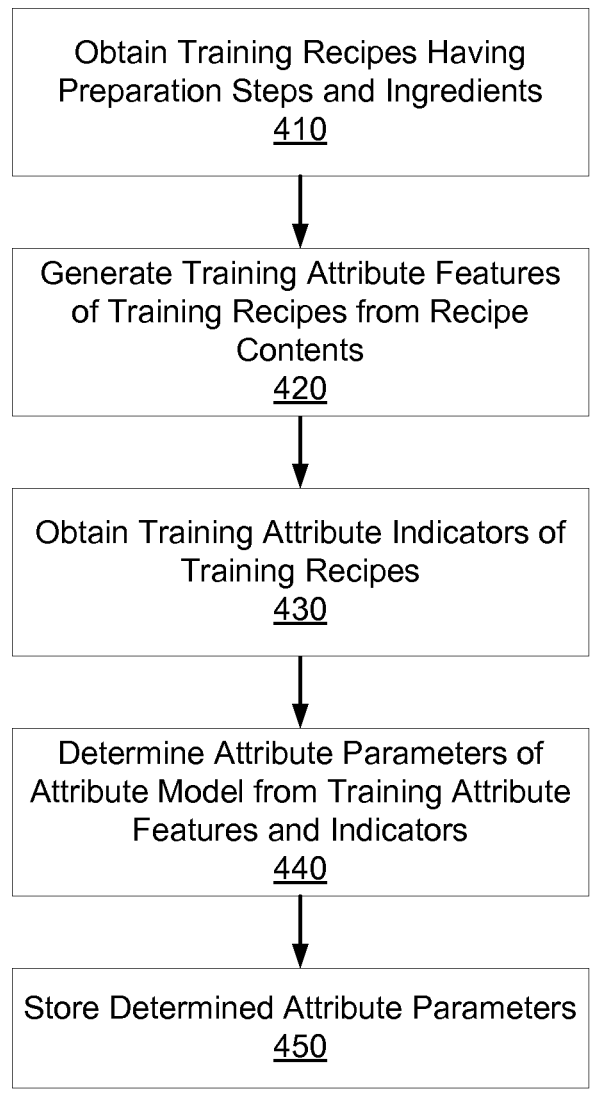
FIG. 4 is a flowchart illustrating a method for training a recipe model to determine attribute parameters, in accordance with an embodiment.

FIG. 4 is a flowchart illustrating a method for training a recipe model to determine attribute parameters, in accordance with an embodiment. The recipe server 120 obtains 410 training recipes (e.g., from a recipe source 110, from the recipe store 205) having training recipe contents such as training preparation steps and training ingredients.

From the obtained recipe, the attribute feature identifier 305 generates 420 training attribute features from the training recipe contents. These training attribute features represent portions of the training recipes correlated with a temporally recurring time range or event. For example, the attribute feature identifier 305 generates 420 training attribute features by matching text of the preparation steps to nodes of a food knowledge graph. Other example training attribute features correspond to text, inferred nutrition, or inferred flavor of the training recipe.

The training attribute identifier 360 obtains 430 training indicators of an associated temporal attribute. For example, the training attribute indicators are determined based on incidence of engagements with the training recipes during a time period associated with the training recipes. As another example, the training attribute indicators are determined based on incidence of received search queries during a time period associated with the training recipes. The search queries relate to the training recipes in that the recipes occur in search results generated in response to the search queries. The training attribute indicators may also be obtained 430 through manual classification or from tags present in the recipe source 110.

The attribute model trainer 370 determines 440 the attribute parameters by training the attribute model 365 to predict whether the training recipes are associated with the temporal attribute based on the generated training features. For example, the attribute model trainer 370 determines 440 attribute parameters that minimize discrepancy between output of the attribute model 365 and the obtained training attribute indicators.

The attribute engine 215 then optionally stores 450 the determined attribute parameters associated with attribute features for later use by the attribute engine 215 for determining whether recipes (without training attribute indicators) are associated with a temporal attribute.

Attribute parameter determination may be performed as a batch process (e.g., periodically), or attribute parameters may be updated based on attribute parameters determined from previously unconsidered training recipes. For example, the attribute model trainer 370 updates the attribute parameters using a weighted average between previously determined attribute parameters and attribute parameters determined for the previously unconsidered training recipes.

Figure 5:
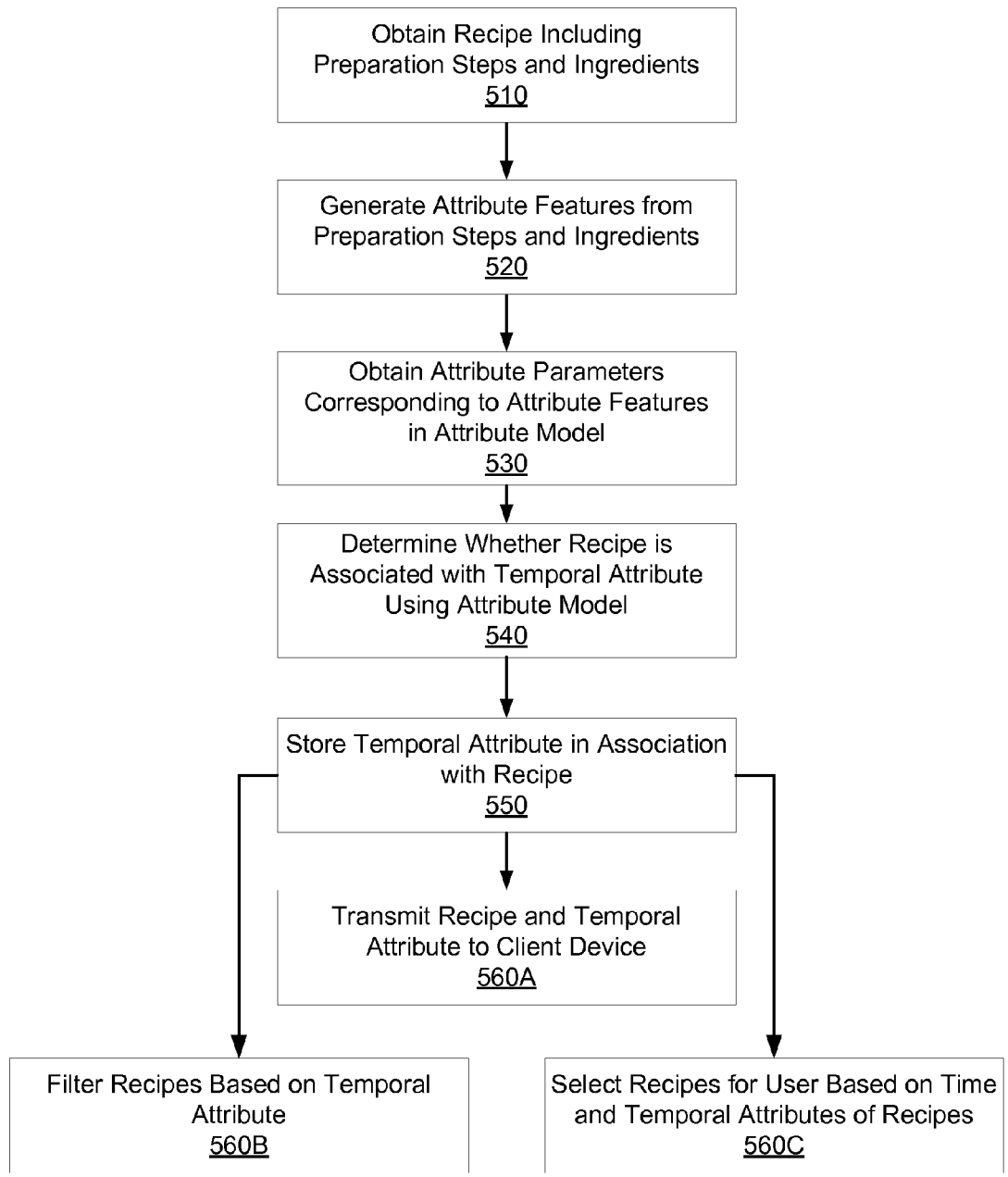
FIG. 5 is a flowchart illustrating a method for determining whether a recipe is associated with a temporal attribute, in accordance with an embodiment.

FIG. 5 is a flowchart illustrating a method for determining whether a recipe is associated with a temporal attribute, in accordance with an embodiment. The recipe server 120 obtains 510 recipes (e.g., from a recipe source 110, from the recipe store 205) having recipe contents such as preparation steps and ingredients.

From the obtained recipe, the attribute feature identifier 305 generates 520 attribute features from the recipe contents. These attribute features represent portions of the recipes correlated with a recurring time period or event. For example, the attribute feature identifier 305 generates 520 attribute features from text in the recipe corresponding to a node of a food knowledge graph. The attribute feature identifier 305 may also generate 520 attribute features corresponding to an abstraction of a node in the food knowledge graph or incidence of an attribute feature among other recipes in the recipe store 205 (i.e., popularity of a recipe feature). Other example training attribute features correspond to inferred nutrition or flavors of a recipe, as well as temporal correlations of engagements with a recipe.

The attribute engine 215 obtains 530 attribute parameters corresponding to the generated attribute features in the attribute model 365. Obtaining attribute parameters includes retrieving stored attribute parameters or determining attribute parameters. For example, the attribute model trainer 370 determines the attribute parameters as described with respect to FIG. 4.

The attribute engine 215 determines 540 whether the recipe is associated with the temporal attribute using the attribute model 540. The attribute engine 215 uses the generated attribute features as inputs to the attribute model 365 modified by the obtained attribute parameters. The output of the attribute model 365 corresponds to whether the recipe is associated with the temporal attribute. For example, the attribute engine 215 determines 540 that the recipe is associated with the temporal attribute in response to the output equaling or exceeding a threshold output. As another example, the attribute engine 215 determines a ranking of the recipe among other recipes according to the output of the attribute model 365. In this example, the attribute engine 215 determines that the recipe is associated with the temporal attribute in response to determining that the recipe's ranking among the other recipes equaling or exceeding a threshold ranking.

The attribute engine 215 optionally stores 550 the temporal attribute in association with the recipe if the attribute engine 215 determines that the temporal attribute is indeed associated with the recipe.

The recipe server 120 may use the temporal attribute associated with a recipe for various functions. For instance, the recipe server 120 includes the temporal attribute as part of presenting the recipe in a recipe browsing interface 230. When a client device 130 requests to view the recipe, the recipe server 120 transmits 560A the recipe including the temporal attribute to the client device 130.

The recipe server 120 may also filter 560B search results (or other requests for recipes) based on criteria specifying the temporal attribute. For example, the recipe server 120 receives a request from a client device 130 for recipes having (or not having) a temporal attribute. The recipe search engine 235 determines which recipes have the temporal attributes meeting the specified criteria and transmits those recipes that do fit the criteria to the client device 130.

The recipe recommendation engine 240 may select 560C recipes for a user based at least in part on a current time (i.e., the time at which selection is made) and temporal attributes of the recipes. The recipe recommendation engine 240 selects recipes based on a comparison of the current time to the time range associated with a temporal attribute of a recipe. For example, the current time is noon on January $1^{st}$, which is associated with the temporal attributes of "New Year's day" and "lunch." Accordingly, the recipe recommendation engine 240 recommends healthy sandwiches including eggs. Thus, the recipe server 120 may use the temporal attribute in one or more different contexts.

Example Recipe

FIG. 6 illustrates an example recipe 600 from a recipe source 110 with example recipe component classifications, in accordance with an embodiment. The content of the recipe includes a title 612, a serving size 613, a total preparation time 615, ingredients 620, and preparation steps 630. The attribute feature identifier 305 may identify attribute features from any portion of the recipe content.

The title 612 includes the text "orange," which the text feature identifier 325 recognizes as an example attribute feature. The attribute feature representing the text "orange" is correlated with the recipe having a "Halloween" seasonal attribute.

The serving size 613 is relatively low, so the ingredient quantity feature identifier 330 generates an example feature indicating a low number of servings, which is correlated with the recipe having an "evening" temporal attribute.

The total preparation time 615 is relatively high, so the preparation time feature identifier 340 generates an example feature indicating a long preparation time, which is correlated with the recipe having an "evening" temporal attribute.

The ingredients 620 include carrots, rabbit, and Russet potatoes. The graph feature identifier 310 generates example attribute features corresponding to rabbit and Russet potatoes. These example attribute features are correlated with "evening" and "Fall" temporal attributes, respectively. The ancestor feature identifier 320 may generate an attribute feature representing a potato to supplement or replace the attribute feature representing the Russet potato because potato is an abstraction of potato in the food knowledge graph. Such an attribute feature may improve data quality when dealing with less common ingredients.

The preparation steps 630 include an instruction to cook the rabbit to medium rare over an open flame. The combination feature identifier 315 identifies an example attribute feature corresponding to the pair of nodes representing the rabbit and the open flame. This pair is associated with the recipe having an "evening" temporal attribute. The text feature identifier 325 identifies an example attribute feature corresponding to the text "cook to medium rare," which is correlated with the recipe having an "evening" temporal attribute.

Knowledge Graph

Figure 7A:
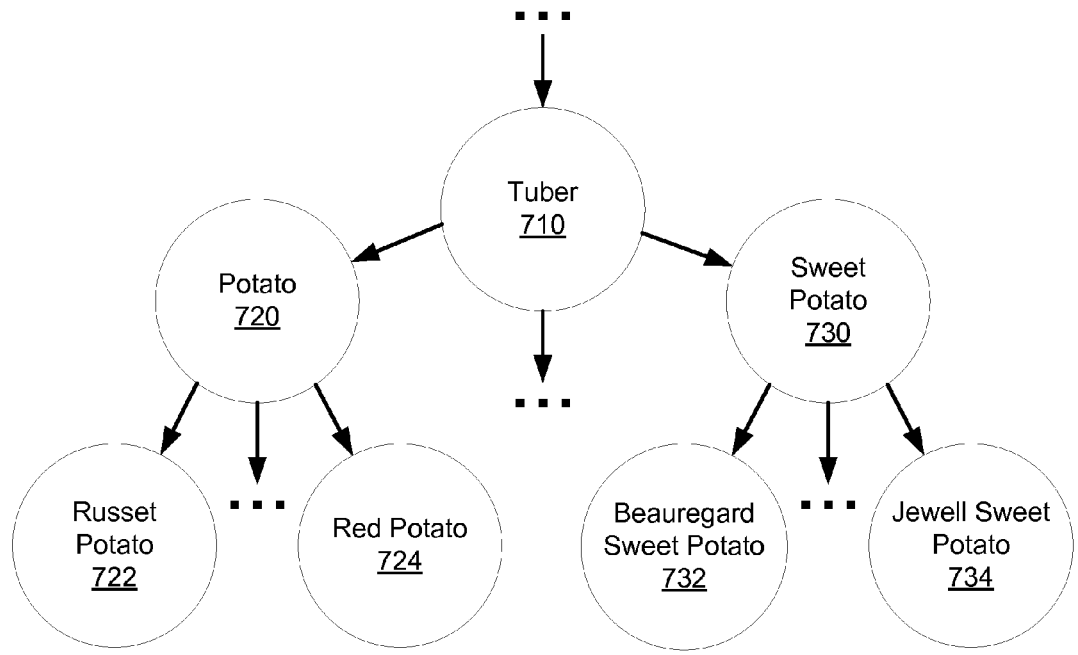
FIGS. 7A and 7B are conceptual diagrams illustrating example sections of the knowledge graph, in accordance with an embodiment.
Figure 7B:
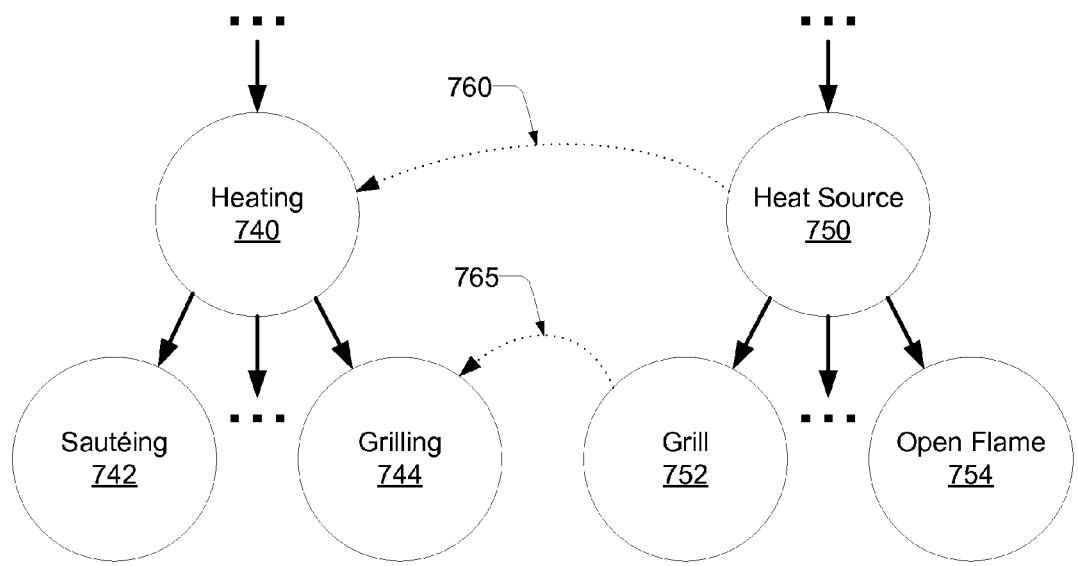

FIGS. 7A and 7B are conceptual diagrams illustrating example sections of the knowledge graph, in accordance with an embodiment. The example section of the knowledge graph illustrated in FIG. 7A includes nodes representing ingredients such as a Russet potato 722, a red potato 724, a Beauregard sweet potato 732, and a Jewell sweet potato 734. The example section also includes abstractions of ingredients including a potato 720, a sweet potato 730, and a tuber 710. The directed edges indicate relationships among the nodes of the illustrated section. In this case, an edge from a first node to a second node indicates that the second node represents an instance of an abstraction represented by the first node. For example, a Russet potato 722 and a red potato 724 are instances of a potato 720, and the potato 720 and the sweet potato 730 are instances of the tuber 710. The ellipses indicate that the illustrated section is an excerpt of an example knowledge graph from the knowledge graph store 210. For instance, the tuber 710 is an instance of the abstraction "root vegetable," and there are additional types of potatoes 710, sweet potatoes 720, and tubers 730. Hence, the knowledge graph organizes food information.

The example sections of the knowledge graph illustrated in FIG. 7B include nodes representing cooking techniques and cooking equipment, respectively. Similar to the section of the graph representing ingredients, a directed edge from a first node to a second node indicates that the second node represents an instance of an abstraction represented by the first node. Thus, the cooking techniques sautéing 742 and grilling 744 are instances of cooking 740, which is a cooking technique abstraction. The cooking equipment grill 752 and open flame 754 are instances of the cooking equipment abstraction heat source 750. The directed edges 760 and 765 from nodes representing cooking equipment to nodes representing cooking techniques indicate that the cooking equipment is used to perform the cooking technique. For example, the directed edge 760 indicates that a heat source 750 is used for heating 740, and the directed edge 765 indicates that a grill 752 is used for grilling 744.

The attribute feature identifier 305 may use the food knowledge graph in inferring a temporal attribute of a recipe. When there is insufficient training data to use an attribute feature associated with recipe content, the attribute feature identifier 305 may use the food knowledge graph to generate a replacement attribute feature. This replacement attribute feature may be an abstraction of a cooking technique, cooking equipment, or an ingredient in the unused attribute feature. For example, if the attribute feature corresponding to the ingredient "Russet potatoes" has insufficient data to calculate a corresponding attribute parameter, the attribute feature identifier 305 may substitute an attribute feature corresponding to the ingredient abstraction "potatoes" because Russet potatoes 722 are an instance of potatoes 720 in the food knowledge graph. As another example, if there is insufficient training data to determine the attribute parameter associated with the cooking equipment open flame 754, then the attribute feature identifier 305 uses an attribute associated with the cooking equipment heat source 750.

Computer System

Figure 8:
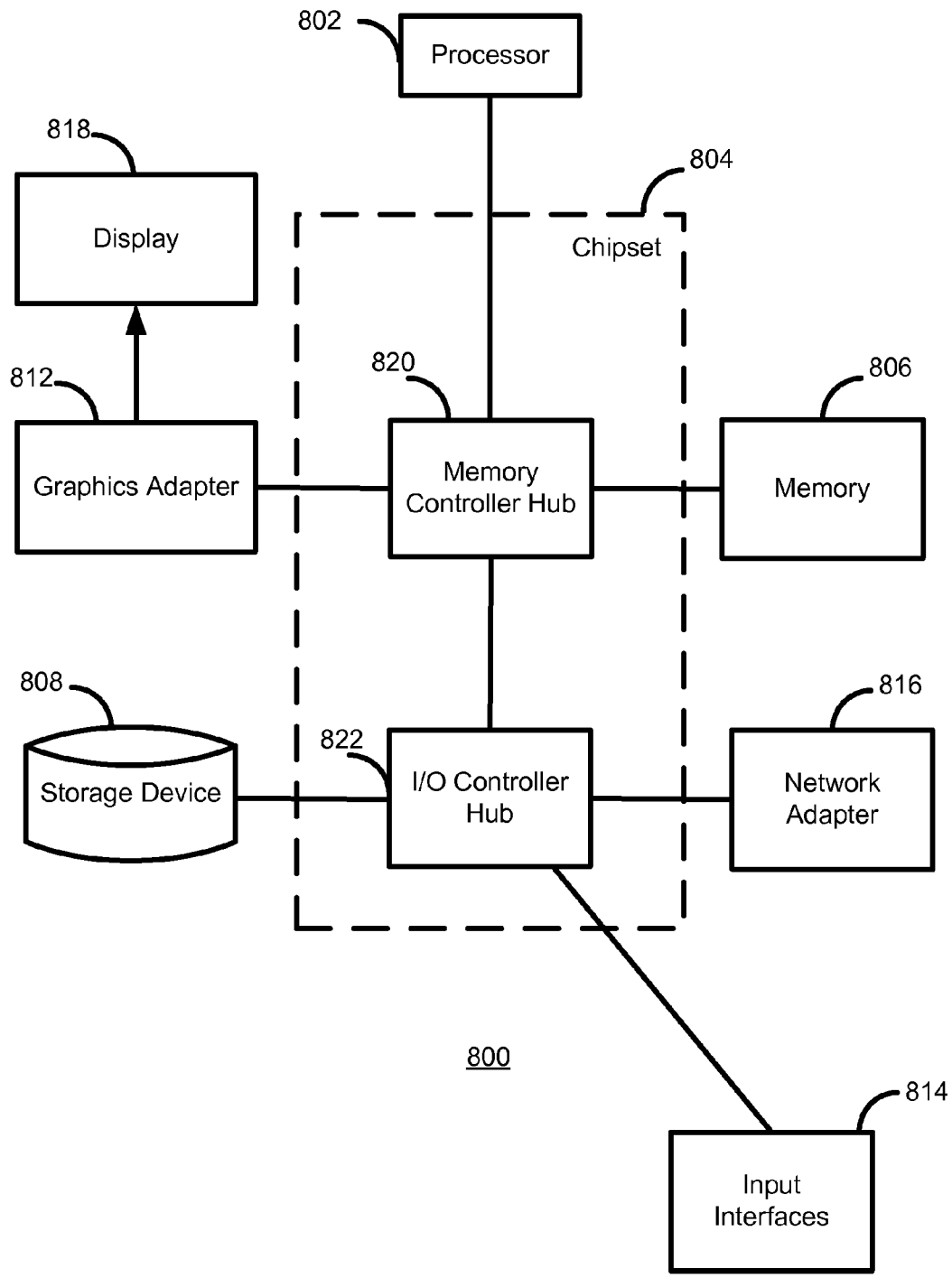
FIG. 8 is a block diagram illustrating an example computer for implementing the entities such as the recipe server shown in FIG. 2, in accordance with an embodiment.

FIG. 8 is a block diagram illustrating an example computer 800 for implementing the entities such as the recipe server 120 shown in FIG. 1, in accordance with an embodiment. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, input interfaces 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interfaces 814 may include a touch-screen interface, a mouse, track ball, or other type of pointing device, a keyboard, a scanner or other conventional digitizer, or some combination thereof, and is used to input data into the computer 800. The graphics adapter 812 displays images and other information on the display 818. The network adapter 816 couples the computer 800 to one or more computer networks.

The computer 800 is adapted to execute computer program modules (e.g., the attribute engine 215, the attribute feature identifier 305, the attribute model 365) for recipe seasonality inference. As used herein, the term "module" refers to computer program logic used to provide the specified functionality. Thus, a module may be implemented in hardware, firmware, and/or software. In one embodiment, program modules are stored on the storage device 808, loaded into the memory 806, and executed by the processor 802.

The type of computer 800 used by the entities of the environment 80 can vary depending upon the embodiment. For example, the recipe source 110 or recipe server 120 may include multiple computers 800 communicating with each other through the network 140 to provide the functionality described herein. Such computers 800 may lack some of the components described above, such as graphics adapters 812 and displays 818. As another example, the client device 130 is implemented on a mobile device, laptop, or tablet containing at least some of the components of the computer 800.
Additional Considerations Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The modules described herein represent an implementation of one embodiment, but various other embodiments may include additional, fewer, or different modules to implement the methods, systems, or non-transitory, computer-readable media delineated in the accompanying claims. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for inferring a temporal characteristic of a recipe, the method comprising:
    obtaining a recipe comprising ingredients in a food item described by the recipe and further comprising preparation steps describing how to prepare the food item;
    generating attribute features correlated to a temporal attribute of recipes, the attribute features generated from at least one of: the ingredients and the preparation steps;
    obtaining attribute parameters corresponding to the generated attribute features in an attribute model, the attribute parameters specific to the temporal attribute;
    determining, by a processor, whether the recipe is associated with the temporal attribute by using the generated attribute features as inputs to the attribute model modified by the attribute parameters;
    storing the temporal attribute in association with the recipe; and
    in response to a request from a client device, providing the recipe and the temporal attribute to the client device, thereby causing the client device to present the recipe and the temporal attribute to a user of the client device.

2. The method of claim 1, further comprising:
    receiving a request for recipes from the client device, the request specifying the temporal attribute;
    wherein the recipe and temporal attribute are provided to the client device responsive to receipt of the request for recipes.

3. The method of claim 1, further comprising:
    determining whether a plurality of recipes are associated with the temporal attribute; and
    selecting a subset of the plurality of recipes to recommend to the user based at least in part on a current time, and whether the subset of the plurality of recipes are associated with the temporal attribute.

4. The method of claim 1, wherein the temporal attribute is a seasonal attribute associated with an annually recurring event.

5. The method of claim 1, wherein generating the attribute features comprises:
    generating an attribute feature corresponding to incidence of engagements with the recipe during a time period associated with the temporal attribute.

6. The method of claim 1, wherein generating the attribute features comprises:
    generating an attribute feature corresponding to incidence of received search queries during a time period, the search query related to the recipe, the time period associated with the temporal attribute.

7. The method of claim 1, wherein generating the attribute features comprises:
    generating a first attribute feature from text in the recipe, the text corresponding to a first node of a food knowledge graph, the first node representing at one of: an ingredient, a cooking technique, and cooking equipment.

8. The method of claim 7, wherein generating the attribute features comprises:

generating a second attribute feature corresponding to a second node of the food knowledge graph, the second node representing an abstraction of the first node.

9. The method of claim 1, wherein the attribute model is a machine learning algorithm, the method further comprising:
generating training attribute features of training recipes from at least one of: training ingredients of the training recipes and training preparation steps of the training recipes;
obtaining indicators of whether the training recipes are associated with the temporal attribute; and
determining the attribute parameters by training the attribute model to predict whether the training recipes are associated with the temporal attribute based on the generated training features, the attribute model trained to minimize discrepancy between output of the attribute model and the obtained indicators.

10. The method of claim 9, wherein obtaining the indicators of whether the training recipes are associated with the temporal attribute comprises:
determining whether the training recipes are associated with the temporal attribute based on incidence of engagements with the training recipes during a time period associated with the training recipes.

11. The method of claim 9, wherein obtaining the indicators of whether the training recipes are associated with the temporal attribute comprises:
determining whether the training recipes are associated with the temporal attribute based on incidence of received search queries during a time period, the search queries relating to the training recipes, the time period associated with the training recipes.

12. A non-transitory computer-readable medium comprising instructions executable by a processor, the instructions for:
obtaining a recipe comprising ingredients in a food item described by the recipe and further comprising preparation steps describing how to prepare the food item;
generating attribute features correlated to a temporal attribute of recipes, the attribute features generated from at least one of: the ingredients and the preparation steps;
obtaining attribute parameters corresponding to the generated attribute features in an attribute model, the attribute parameters specific to the temporal attribute;
determining, by a processor, whether the recipe is associated with the temporal attribute by using the generated attribute features as inputs to the attribute model modified by the attribute parameters;
storing the temporal attribute in association with the recipe; and
in response to a request from a client device, providing the recipe and the temporal attribute to the client device, thereby causing the client device to present the recipe and the temporal attribute to a user of the client device.

13. The computer-readable medium of claim 12, the instructions further comprising instructions for:
receiving a request for recipes from the client device, the request specifying the temporal attribute;
wherein the recipe and temporal attribute are provided to the client device responsive to receipt of the request for recipes.

14. The computer-readable medium of claim 12, wherein the computer-readable medium further comprises additional instructions for:
determining whether a plurality of recipes are associated with the temporal attribute; and
selecting a subset of the plurality of recipes to recommend to the user based at least in part on a current time, and whether the subset of the plurality of recipes are associated with the temporal attribute.

15. A system for inferring a temporal characteristic of a recipe, the system comprising:
a processor;
a non-transitory, computer-readable medium comprising instructions executable by the processor, the instructions for:
obtaining a recipe comprising ingredients in a food item described by the recipe and further comprising preparation steps describing how to prepare the food item;
generating attribute features correlated to a temporal attribute of recipes, the attribute features generated from at least one of: the ingredients and the preparation steps;
obtaining attribute parameters corresponding to the generated attribute features in an attribute model, the attribute parameters specific to the temporal attribute;
determining, by a processor, whether the recipe is associated with the temporal attribute by using the generated attribute features as inputs to the attribute model modified by the attribute parameters;
storing the temporal attribute in association with the recipe; and
in response to a request from a client device, providing the recipe and the temporal attribute to the client device, thereby causing the client device to present the recipe and the temporal attribute to a user of the client device.

16. The system of claim 15, the instructions further comprising instructions for:
receiving a request for recipes from the client device, the request specifying the temporal attribute;
wherein the recipe and temporal attribute are provided to the client device responsive to receipt of the request for recipes.

17. The system of claim 15, wherein the computer-readable medium further comprises additional instructions for:
determining whether a plurality of recipes are associated with the temporal attribute; and
selecting a subset of the plurality of recipes to recommend to the user based at least in part on a current time, and whether the subset of the plurality of recipes are associated with the temporal attribute.

* * * * *